J. OAKLEY.
BROACHING IMPLEMENT.
APPLICATION FILED DEC. 28, 1918.
1,318,102.
Patented Oct. 7, 1919.
3 SHEETS—SHEET 1.
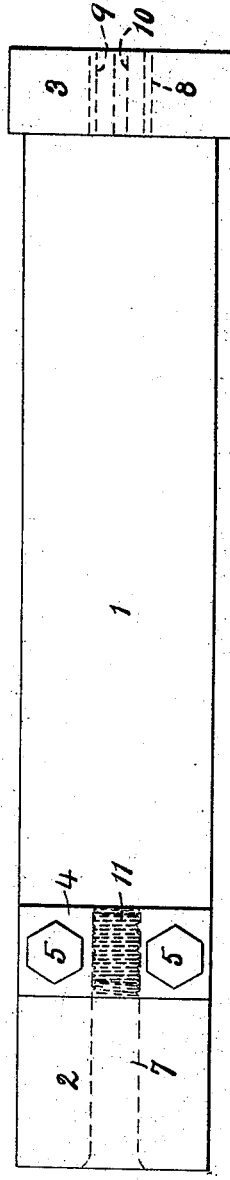
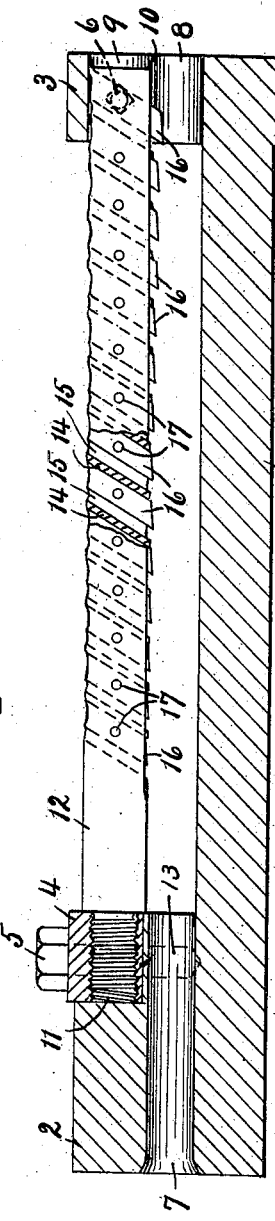
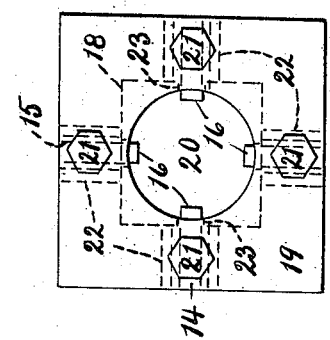
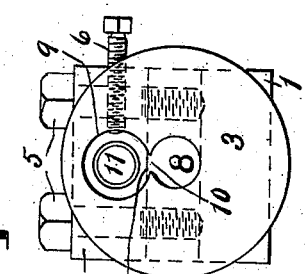
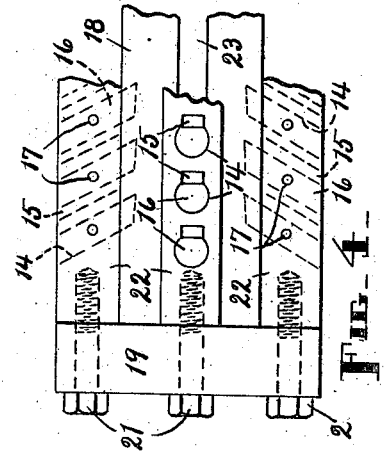
WITNESS
*A. C. Fairbanks*
INVENTOR.
*John Oakley.*
BY
*Frank A. Cutter,*
ATTORNEY.

J. OAKLEY.
BROACHING IMPLEMENT.
APPLICATION FILED DEC. 28, 1918.
1,318,102.
Patented Oct. 7, 1919.
3 SHEETS—SHEET 2.
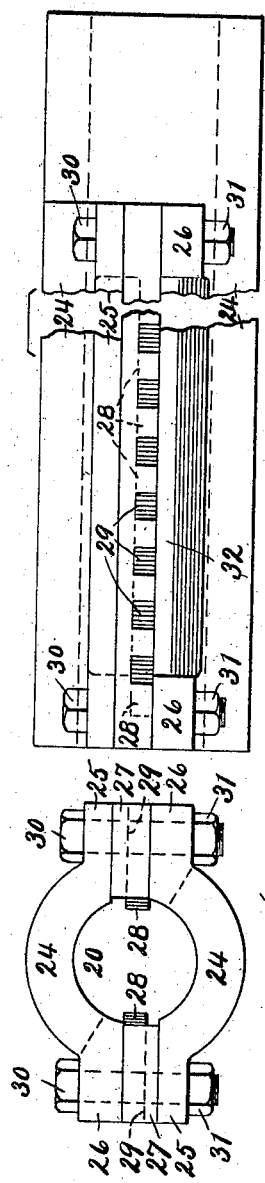
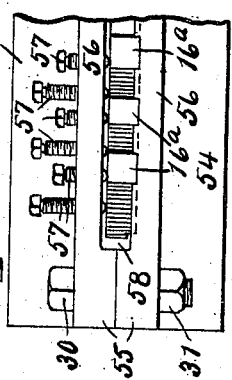
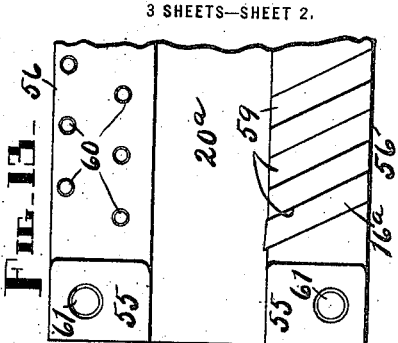
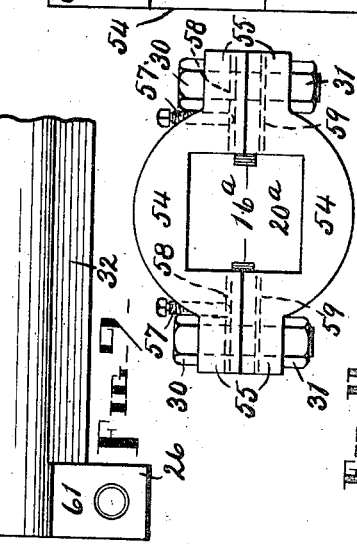
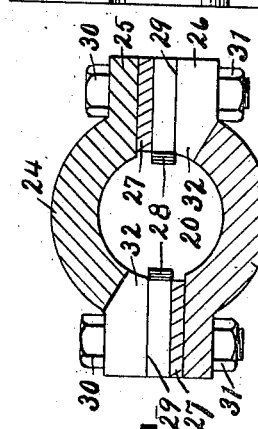
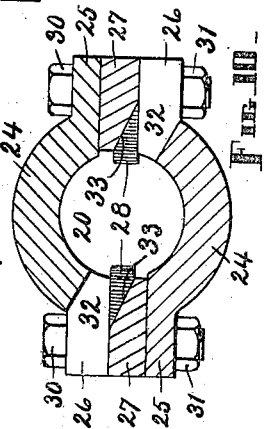
WITNESS
A. C. Fairbanks
INVENTOR.
John Oakley.
BY
Frank A. Cutter,
ATTORNEY.

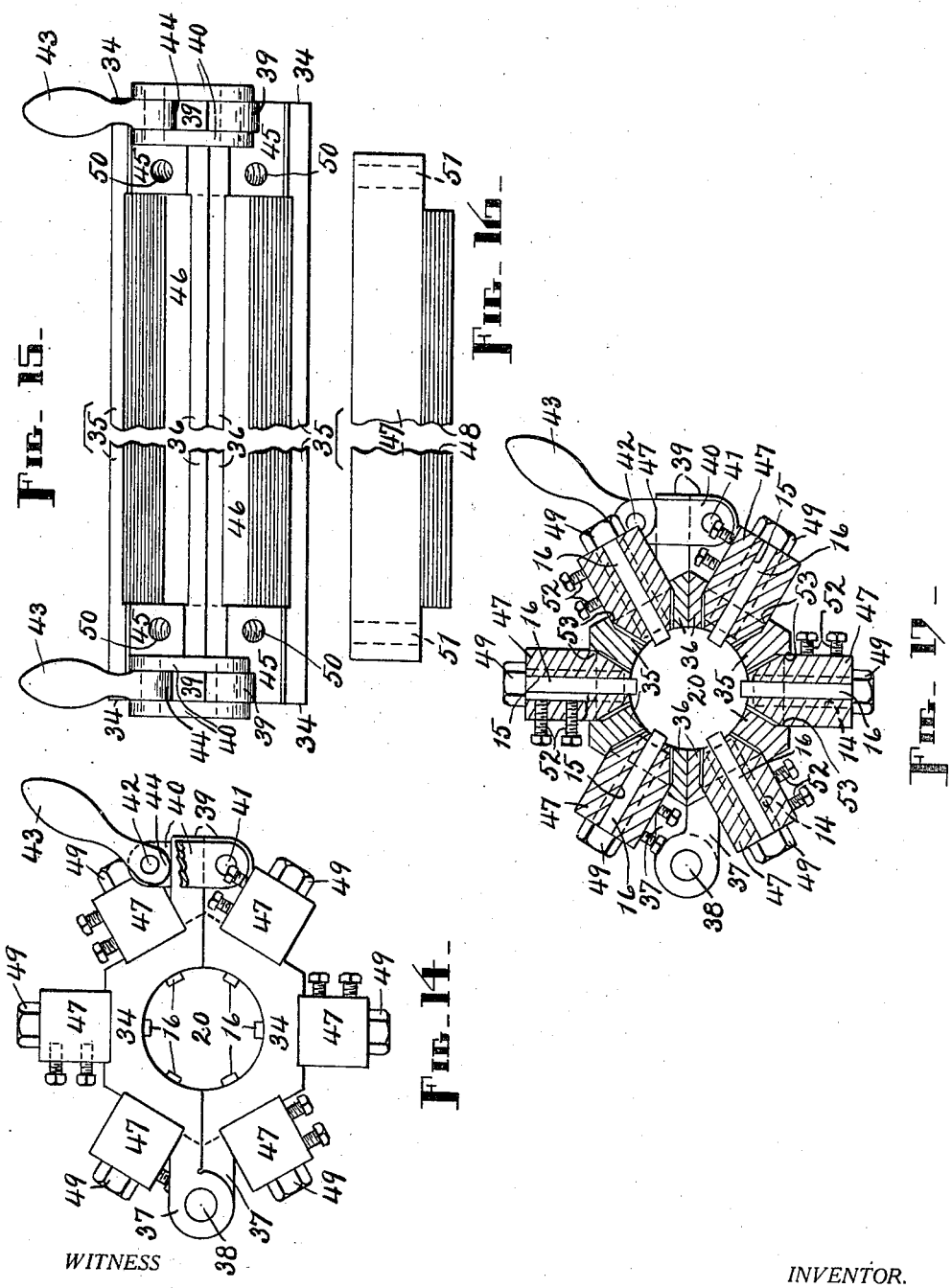

UNITED STATES PATENT OFFICE.

JOHN OAKLEY, OF SPRINGFIELD, MASSACHUSETTS.

BROACHING IMPLEMENT.

1,318,102.  Specification of Letters Patent.  Patented Oct. 7, 1919.

Application filed December 28, 1918. Serial No. 268,613.

*To all whom it may concern:*

Be it known that I, JOHN OAKLEY, a subject of the King of England, residing in Springfield, in the county of Hampden and State of Massachusetts, have invented new and useful Improvements in Broaching Implements, of which the following is a specification.

My invention relates to improvements in the art of broaching, and resides in an implement which comprises a tooth-provided frame or holder in which the object being broached is received and through which such object is usually forced or drawn in operative relation to the teeth, during the broaching operation, all as hereinafter set forth.

This implement may be made in various shapes and sizes to adapt the same to the particular work required, and to the number of grooves which it is desired to cut in a given piece of work. And, although I have illustrated in connection herewith several forms of construction, the number of possible and practicable variations in construction is by no means exhausted thereby. I do not, therefore, limit myself to what is herein shown and described, but desire to claim broadly a tooth-provided holder which is adapted to receive the work, and to be supported on and guided by or to support and guide the work, accordingly as the implement be actuated while the work is held stationary, or the work be actuated while the implement is held stationary, the latter being the usual method, during the time the teeth are making their cut or cuts.

Heretofore exterior keyways and tooth-forming grooves in shafts and other objects, and longitudinal, outside grooves generally in shafts, spindles, and numerous other cylindrical objects or objects which are curved, round, or angular in cross section, have been planed or milled. Much time and expense are involved in either planing or milling, as is well known. With this broaching implement the same or better results are obtained in but a fraction of the time and at greatly reduced cost, in comparison with those obtained with planing or milling tools. The primary object of my invention, therefore, is to afford means for more expeditiously and economically cutting longitudinal grooves in the outside surface of objects, which grooves would otherwise have to be planed or milled out.

In some cases my broaching implement may be used for cutting castellated shafts, such as are widely used in automobile construction, and even for cutting some gears.

As previously intimated, this invention is applicable or adaptable to the work of cutting single or multiple, longitudinal grooves of almost any kind.

A further object is to provide a frame or holder, for a broaching implement of the type described above, with which the teeth or the member or members that are equipped with the teeth can be securely united and from which they can be detached, conveniently and with reasonable despatch. It is possible, therefore, to make changes in cutting members readily, and to sharpen or repair any injury to such members with the least possible difficulty and expense.

There is involved in or with the operation of broaching, provided such operation be successful, the necessity of affording ample clearance for the chips cut by the broach, and another and highly important object is to afford such clearance in and in connection with my broaching implement.

Still another object is to produce a broaching implement the holder of which is capable of carrying tooth-provided members that may have integral teeth, or such members that may have removable teeth. In other words, my invention contemplates the use of tooth-provided members, which members are the cutters or broaches, having integral teeth and those having separable or removable teeth.

In the event the implement comprises a holder which carries the teeth without any intervening member, the portions of the holder which carry the teeth and the latter together constitute the cutter or broach or the cutters or broaches of the implement.

Ordinarily a broach is forcibly actuated through the work, but, although the present broaching implement might be actuated while the work is held stationary, as in the other case, and as previously observed, usually and preferably the implement is held rigidly, while the work is forcibly actuated through the same, suitable mechanical means or a suitable machine being provided for the purpose. Thus are produced accurately cut grooves which have well finished walls.

Other objects and advantages will appear in the course of the following description.

I attain the objects and secure the advantages of my invention by the means illustrated in the accompanying drawings, in which—

Figure 1 is a top plan of the holder of the broaching implement shown in the next view; Fig. 2, a central, longitudinal, vertical section through a single-cutter broaching implement which embodies a practical form of my invention, the larger part of the cutter or broach being in elevation, with a portion of one side in the middle broken away to show the construction; Fig. 3, a right-hand or rear end elevation of the holder of said implement; Fig. 4, a fragmentary, side elevation of a multiple-cutter broaching implement; Fig. 5, an end elevation of the same; Fig. 6, an end elevation of the broaching implement shown in the next view; Fig. 7, a side elevation of a multiple-cutter broaching implement of the double-cutter type, a considerable portion of said implement intermediate of the ends being broken out; Fig. 8, a cross-section through said last-named broaching implement; Fig. 9, a top plan of the under holder section of said last-named broaching implement; Fig. 10, a cross-section illustrating a modification of the broaching implement shown in the three immediately preceding views; Fig. 11, an end elevation of the broaching implement shown in Fig. 12; Fig. 12, a fragmentary, side elevation of another form of the double-cutter type of broaching implement; Fig. 13, a top plan of the under holder section of said last-named implement, one of the teeth being in position; Fig. 14, an end elevation of still another multiple-cutter broaching implement; Fig. 15, a side elevation of the holder of said last-named broaching implement, the middle portion being broken out; Fig. 16, a side elevation of one of the cutter bars used in said last-named broaching implement, the middle portion being broken out, and, Fig. 17, a cross-section through said last-named broaching implement.

The holders of all the broaching implements herein appearing, except the first two, are sectional and separable, the sections of the holder of the last implement being hinged. The cutter teeth in the construction illustrated in Figs. 6, 7, 8, and 10 are integral with the cutter bars, while in each of the other examples herein shown such teeth are removable from such bars or from the tooth-receiving parts of the holder itself, as the case may be.

Similar reference characters designate similar parts throughout the several views.

In each example given and in any example of my invention there are a frame or holder, one or more cutters or broaches each comprising a bar or equivalent member, or an integral part or parts of said holder, and a plurality of teeth, either integral or separable, and means to secure such broach or broaches in place in the holder or to unite the teeth with the broach parts of the holder.

In every case there are chip-clearance openings or passages in the cutter or cutters themselves or in or between the same and the holder, which open to the outside of the implement, so that the chips as cut are permitted to and do pass freely through to such outside, and consequently there is no clogging incident to the presence of chips at or adjacent to the place or places where the cutting is occurring, or at any point in the implement.

I will now take up the several broaching implements of the drawings, beginning with that which is shown in the first three views.

The frame or holder here consists of a horizontal base 1, upstanding front and rear end pieces 2 and 3, respectively, the former being rectangular and the latter circular, and a transverse bar 4, together with two bolts 5 to hold said clamp in place. There are alining, horizontal passages or openings 7 and 8 in the end pieces 2 and 3, respectively, for the objects to be broached, that is to say, the work. There is also an opening 9 in the end piece 3 directly above the opening 8, and these two openings communicate with each other at 10. The end piece 2 is wider or thicker than the end piece 3, and the former is cut away on the inside above the passage 7 to receive the bar 4, such bar being secured to said end piece 2 by means of the bolts 5 which pass through said bar into threaded engagement with the end piece on opposite sides of the central, longitudinal, vertical plane thereof. An opening 11 is tapped into and through the bar 4, in the transverse center thereof.

The single cutter or broach furnished for this holder consists of a round rod or bar 12, provided at the front end with a screw-threaded head 13 to engage the tapped opening 11 in the bar 4, and having therein a plurality of teeth openings 14 and chip-clearance passages 15, such openings and passages being obliquely arranged, with the inclination from above downwardly and forwardly, assuming that said bar is positioned so that said passages are in a vertical plane, and teeth 16 located in said openings and held therein by means of pins 17 which pass transversely through said bar and teeth. The teeth 16 are in a plane common to each other and to the axial center of the bar 12, and the projection beyond said bar of the cutting edge portion of each succeeding tooth, from front to rear, is slightly greater than that of the tooth in front, as is customary in broach construction. This arrangement of the teeth or of their cutting-edge portions relative to the bar and to each other is the same in all cases. The forward end of the bar 12 is held in and by the bar 4, while the rear end of said first-named bar is received in the opening 9 in the end piece 3, and held therein by means of a bolt 6, which latter is tapped into one side or edge of said end piece and adapted to engage that part of said bar 12 that is in said opening. The cutting-edge portion of the rearmost tooth 16 extends through the opening 10 into the opening 8, and it is for this purpose, and to enable the cutter to be pushed rearwardly for attaching and detaching purposes, that such opening 10 is provided.

In attaching the broach to the holder, the rear end of the former is inserted in the opening 9 and said broach is pushed through said opening, the cutting-edge portions of the teeth 16 passing through the opening 10, until that portion of the bar 12 which is forward of said teeth is in said opening 9, next the bar 4 is placed against the head 13 and said bar 12 is rotated to screw said head into the opening 11, and then, after screwing said head into said bar 4 the required distance, the parts are drawn forward and said bar is seated on the end piece 2, and secured with the bolts 5. The broach is now so arranged relative to the holder that the teeth 16 are perpendicular to the longitudinal center of said holder and in the central, longitudinal, vertical plane thereof, and of a shaft or other object which may be located in the openings 7 and 8. These openings have the same diameter in the present case, although for some work there might be a variation in this respect, and bushings might be employed, all of which is generally true of the other constructions, but does not affect the vital principle of the invention.

In practice, the holder is held stationary and the work (not shown) is forced through said holder in the direction from left to right, the work being centered and supported in and guided by the end pieces 2 and 3. As the work is forcibly actuated through the holder the teeth 16 cut a longitudinal groove therein of the width of the cutting-edge portions of the teeth 16 and of the depth of the cutting-edge portion of the rearmost of said teeth. The chips cut by the teeth 16 pass freely through the clearance passages 15 to the top of the bar 12 and there escape without interfering in any way with the broaching operation. The clearance or chip passages 15 are really parts of or extensions from the teeth openings 14 and are in front of the teeth 16, so that the chips cut by said teeth pass up through said clearance passages on the front sides or edges of the teeth. These teeth are similar to those shown in United States Letters Patent, No. 1,272,841, issued to me July 16, 1918, as also are the openings therefor and the chip passages in the bar 12.

To remove the broach from the holder, take out the bolts 5, push the bar 12 through the end piece 3 as before, unscrew said bar from the bar 4, and withdraw said bar 12 from said end piece.

The teeth 16 can be removed by driving out the pins 17, wherefore it is a comparatively simple matter to remove or replace any or all of said teeth, and thus to keep the cutter in repair, and to equip it with whatever style of teeth may be desired.

The broaching implement shown in Figs. 4 and 5, comprises a holder consisting of a center piece 18, which is rectangular in cross-section, and a square end piece 19 at each terminal, with a central, longitudinal, work passage 20 extending clear through these parts, said center and end pieces being integral, and four cutters or broaches arranged between said end pieces, one each side of said center piece, and secured to said end pieces by means of bolts 21. Each broach consists of a bar 22, which may be rectangular in cross-section, and a row of teeth 16 similar to those in the first broach. Each end of each bar 22 is secured to the contiguous end pieces 19 by one of the bolts 21 which is passed through such end piece and is tapped into said bar. The bars 22 have therein openings 14 for the teeth 16 and chip passages 15, and pins 17 are employed to hold said teeth in place, all as in the first construction. Openings 23 for the cutting-edge portions of these teeth 16 are made in the longitudinal centers of the four sides of the center piece 18, to permit such portions to enter the passage 20. The fastening means provided in this case, that is, the horizontal bolts 21, enable the broaches to be placed in position in the holder and to be removed therefrom, and either operation to be performed readily.

The work is forcibly actuated through the passage 20 in the holder of the second broaching implement, from right to left, when four grooves are cut in such work at the outer edges of the central diametrical planes thereof, by the cutting-edge portions of the teeth 16, which are in said passages. The chips as cut pass outwardly through the passages 15 to the outside of the implement, emerging or escaping finally from the bars 22 at their outside edges.

The holder of the broaching implement, illustrated in Figs. 6, 7, 8, and 9, comprises a pair of sections 24, which sections are segmental in cross-section, and have lateral flanges or lips 25—25 and four lateral lugs 26; and the two cutters or broaches, with which said implement is equipped, comprise a pair of bars 27 provided with integral teeth 28, and having clearance passages 29 therein. There is a lip 25 on one side of each section 24, which extends the entire length of such section, and there are two lugs 26 on the opposite side of the section at and adjacent to the ends. The bars 27 are of the same length as the sections 24, and the former are received between the outlying portions of said sections and secured thereto by means of four bolts 30 and a corresponding number of nuts 31, said bolts passing through the lugs 26, lips 25, and said bars. The parts are arranged so as to locate one of the lips 25 above one of the bars 27 and the other lip under the other bar. When the parts are assembled and bolted together, a work passage is formed which extends through the implement from end to end, such passage being designated by the numeral 20 as in the second implement. Each bar 24 is cut out lengthwise between the lugs 26 thereon to form a chip-clearance passage or slot 32 in such bar.

The teeth 28 do not extend the entire distance across the inner edges of the bars 27, but from the upper side part way to the under side on one bar, and from the under side part way to the upper side on the other bar, assuming that said bars are in place in the holder, and the clearance passages 29 open at their inner ends in front of said teeth, and through either the upper or the under side of the bar, as the case may be, into the adjacent clearance slot 32.

It is now clear that, when the work is forcibly actuated through the holder of the third implement, the teeth 28 cut longitudinal grooves in opposite sides of such work, and that the chips escape first into the passages 29, and then from the latter both at their outer ends and at their top and bottom sides, the chips which escape from the sides of said passages passing into the slots 32 and from there to the outside of the holder.

For the purpose of this explanation it is assumed that the teeth are so arranged or inclined that the work enters the holder from the left-hand end.

If desired the chip-clearance passages in the bars 27 may be arranged to open only into the slots 32, instead of opening through the outer edges of said bars as well as into such slots. To this end the bars 27, in Fig. 10, have herein short, oblique-sided passages 33, which open at their inner ends, like the passages 29, into the passages 20, and at the top, on one side of the holder, and at the bottom, on the other side of the holder, into the slots 32.

The implement illustrated in the last four views is equipped with six cutters or broaches, and the holder is hinged so that it can be opened and closed and locked. This implement is particularly useful for cutting a plurality of slots in work which is of a nature to require the holder to be opened to receive the same, although not necessarily confined to use in connection with work of that kind.

All of the six broaches need not be used, and a holder of this character may be made to be equipped with more or less than that number of broaches.

The holder in this case consists of upper and under end pieces 34, and eight integral, connecting separator bars or separators, there being two separators 35 above and two separators 35 below, and four, intermediate, sectional separators 36 which form two separators each the size of any one of the separators 35 when the holder is closed. On the back sides of the end pieces 34, at each end, are two lugs 37 which are hinged or pivoted together at 38, and on the front sides of said end pieces are two lugs 39. A pair of links 40 is pivoted at the bottom, at 41, to each lower lug 39, and to the upper ends of said links is pivotally attached, at 42, a handle 43, having at its base a cam 44 which is adapted to bear on the top of the upper lug 39 with which such cam is associated. In Fig. 14 the upper portion of one of the links 40 is broken off to show the attached cam 44 in full.

Upon rocking the handles 43 on the pivots 42 to loosen the cams 44 and release the upper lugs 39 therefrom, the links 40 can be swung forward on their pivots 41 to release said lugs, and then the upper section of the holder can be swung up on the pivots 38, thus opening the holder. Conversely, upon closing the upper holder section onto the lower holder section, swinging the links 39 up to locate the cams 44 above the upper lugs 39, and rocking the handles 43 to cause said cams to bind on said lugs, said upper section becomes securely locked in closed position.

When closed the holder has a longitudinal work passage 20 therethrough, similar to the work passages in several of the other implements. In end elevation and cross-section the closed holder has the general outline of a hexagon, but the exterior faces of the end pieces 34 have depressed surfaces in the center thereof to form beds 45, and the corresponding surfaces of the separators 35 and 36 are broken by longitudinal slots 46 between said separators, such slots extending through from the outside to the passage 20.

Each of the aforesaid six broaches consists in part of a bar 47 having the inner portions of its sides tapered, as at 48, to enter one of the slots 46 in the holder, said bar projecting at the ends, beyond the tapered part just mentioned, to rest on two of the beds 45 formed by or on the end pieces 34 of said holder. Bolts 49, passed through the end-projecting portions of the bars 47 and tapped into the beds 45, are employed to secure said bars to said holders. The screw-threaded openings in four of the beds 45, for the bolts 49, appear at 50 in Fig. 15, and the openings through one of the bars 47, for said bolts, are represented at 51—51 in Fig. 16. Thus it is seen that any bar 47 can be released by removing the bolts 49 which hold it in position, when such bar can be removed from the holder, and that said bar, after being replaced in said holder, can be secured again with said bolts.

Each of the bars 47 has therein a series of teeth openings and of chip-clearance passages and is provided with a row of teeth, which are similar to the openings 14 with the teeth 16 therein, and the passages 15, in the first construction. Instead of the pins 17 with which to hold the teeth 16 in place in the present case, bolts 52 are employed. The bolts 52 are tapped into the bars 47, through one side of each, and bear against the teeth 16, there being two bolts for each tooth, as clearly shown at the top of Fig. 17. Thus are the teeth rendered removable. When the broaches are in place the cutting-edge portions of the teeth are in the passage 20, as in the other example where there are similar passages.

The work is actuated from left to right through this last implement.

The tapered portions 48 of the bars 47 clear the sides of the slots 46, but the parallel sides of said bars enter slightly and fit snugly between said sides of said slots, as represented at 53 in Fig. 17.

In Figs. 11, 12, and 13 I show an example of a broaching implement which is somewhat similar to that appearing in Figs. 6, 7, 8, and 9, but in which there are two rows of oppositely-disposed teeth 16ª set directly into the holder, instead of being formed on or set into bars. The teeth 16ª are attached directly to the holder, consequently those parts of the holder that grasp and hold said teeth constitute parts of the two broaches with which said implement is equipped or provided. There are in this implement upper and under holder sections 54, which have a pair of forwardly-extending and a pair of rearwardly-extending lugs 55 at each end, to receive and to be secured together by bolts 30 and nuts 31, as in the case of the third implement, and which also have flanges or lips 56 that extend between said lugs, two rows of teeth 16ª arranged between said lips and the contiguous parts of said sections, with their cutting-edge portions in a central, work passage 20ª that extends through said sections here as in other examples, and bolts 57 to hold or assist in holding said teeth in place. There is a slot 58 between the upper and under lips 56 and contiguous portions of the sections 54, on each side of the holder, where said sections are bolted together, which slot opens into the passage 20ª and to the outside of said holder. In the upper face of the bottom of each slot 58 is a series of oblique slots 59 in which the undersides of the teeth 16ª are received. The bolts 57 are tapped into and through the top of each slot 58, and are designed to be screwed tightly against the upper surfaces of the teeth 16ª, openings for such bolts appearing at 60 in Fig. 13. Clearance passages for the clips cut by the teeth are provided by the unoccupied or open portions of the slots 58, and more especially by such portions which are at the left or in front of and between said teeth. The work here enters at the left. The manner of assembling and disassembling the parts and members of this implement will readily be understood.

In Figs. 9 and 13 openings for the bolts 30 are represented at 61.

The work-receiving openings or passages need not necessarily be circular, but may be of some other shape or shapes. The passage 20ª in Fig. 11, for example, is square, and accommodates objects which are either round or square in cross-section.

What I claim as my invention, and desire to secure by Letters Patent, is—

1. A broaching implement comprising means adapted to receive the work, cutting means carried by said first-named means, and means to direct the chips cut by said second-named means transversely to the outside.

2. An implement, for outside broaching, comprising a holder provided with cutting means, such holder being adapted to receive the work, and having therein a transverse chip-clearance passage.

3. An implement, for outside broaching, comprising a holder provided with cutting means, such holder being adapted to receive the work, and said holder and cutting means having therein transverse chip-clearance passages.

4. In a broaching implement, a holder adapted to receive the work, and cutting means carried by said holder outside of the work, said cutting means having transverse chip-clearance passages therein.

5. In a broaching implement, a holder adapted to receive the work and having a transverse chip-clearance passage therein, and cutting means carried by said holder outside of the work.

6. In a broaching implement, a holder made up of separable sections pivotally connected, said holder being adapted to receive the work, locking means for said sections, cutting means carried by said holder outside of the work, and means to direct the chips cut by said cutting means to the outside.

7. In a broaching implement, a holder adapted to receive the work, cutting means carried by said holder outside of the work, said means having removable teeth, and means to direct the chips cut by such teeth to the outside.

8. In a broaching implement, a holder adapted to receive the work, removable cutting means carried by said holder outside of the work, said means having removable teeth, and means to direct the chips cut by such teeth to the outside.

9. A broaching implement consisting of tooth-provided holding means adapted to receive the work, and opening transversely to the outside for the escape of the chips cut by the teeth.

JOHN OAKLEY.

Witnesses:
F. A. CUTTER,
A. C. FAIRBANKS.

Copies of this patent may be obtained for five cents each, by addressing the "Commissioner of Patents, Washington, D. C."